Patented May 12, 1942

2,282,536

UNITED STATES PATENT OFFICE 2,282,536

METHOD OF PREPARING SYNTHETIC TANNING AGENTS

Robert C. Swain, Riverside, and Pierrepont Adams, Stamford, Conn., assignors to American Cyanamid Company, New York, N. Y., a corporation of Maine No Drawing. Application November 1, 1940, Serial No. 363,874

6 Claims. (Cl. 260—42)

This invention relates to the preparation of synthetic tanning agents of the type obtained by condensing sulfonated aromatic hydrocarbons, phenols and the like with formaldehyde. A principal object of the invention resides in the preparation of synthetic tanning and bleaching agents of this class having both a lighter original color and improved light fastness.

Practically all the synthetic tanning agents or "syntans" now in commercial use are produced by condensing sulfonated aromatic hydrocarbons or sulfonated phenols with formaldehyde. By careful selection of the raw materials and close control of the conditions of sulfonation it is possible to obtain products of this class having a fairly good original color, and this color is greatly improved by carrying out the formaldehyde condensation in the presence of activated carbon. However many of the resulting syntans, and particularly those obtained from sulfonated phenols, are light-sensitive and darken rapidly upon exposure to light for any considerable periods of time and this is also true of the leather tanned or bleached with these classes of syntans.

In our Patent No. 2,237,092 dated April 1, 1941, we described a method of stabilizing formaldehyde by the addition thereto of melamine or methylol melamines in amounts of about 1-10%. We have now discovered that syntans prepared from formaldehyde containing these amounts of melamine dissolved therein have a remarkably improved color and color stability, and that such syntans are much more resistant to discoloration by light. Moreover, we find that the melamine-stabilized formaldehyde described in our earlier application is appreciably more reactive towards sulfonated aromatic hydrocarbons and sulfonated phenols than are the ordinary grades of methanol-stabilized formaldehyde, so that the preparation of syntans therefore is considerably facilitated.

The melamine-stabilized formaldehyde which which we employ in practicing our invention is prepared simply by dissolving 1-10% of melamine or methylol melamine in an aqueous formaldehyde solution, preferably by adding the melamine and heating to 60-80° C. for a short time. It is well-known that aqueous formaldehyde solutions of greater than 30% strength are unstable and precipitate paraformaldehyde on storage at low temperatures, but by the addition of melamine it is possible to employ solutions containing as much as 40-50% of formaldehyde for preparing synthetic tanning agents.

Accordingly, it will be seen that our invention provides at least two extremely important improvements in the production of syntans; first, the presence of melamine in the formaldehyde permits the use of a more concentrated reagent, which materially increases the capacity of the equipment, and secondly it results in a marked improvement in the color and light-resistance of the finished product.

The manufacture of syntans by the process of our invention is not greatly different from the ordinary commercial procedure, insofar as the individual operating steps are concerned. Any suitable aromatic hydrocarbon, such as benzene, naphthalene, anthracene, phenanthrene and the like may be sulfonated with strong sulfuric acid, using either high or low sulfonation temperatures. In the manufacture of syntans of the phenolic type any desired phenol such as phenol itself, cresol, commercial cresylic acids, catechol, resorcinol, hydroxy benzoic acids, gallic acid and the like may be sulfonated in the usual manner. In both cases the resulting aromatic sulfonic acids are then condensed with an aqueous formaldehyde solution, preferably a solution of 40-50% formaldehyde content, having from 1-10% and preferably from 2-7% of melamine dissolved therein.

We have found, as one of the most important features of our invention, that the amounts of melamine necessary to provide a fully stabilized formaldehyde solution of 40-50% formaldehyde content are also the proper amounts to obtain an improved grade of syntans upon condensation with aromatic sulfonic acid, and therefore the use of the amounts of melamine specified above constitutes a preferred embodiment of our invention. Larger quantities of melamine cannot be dissolved in aqueous formaldehyde solutions without undesirable gel formation, and therefore as a practical matter larger amounts are not recommended.

Our improved process will now be illustrated by means of the following typical examples which are intended to illustrate but not limit our invention thereto.

*Example 1*

164 parts o-amyl phenol were cooled to 12° C. and 155 parts of concentrated $H_2SO_4$ slowly added with cooling. 34.6 parts of 50% formalin stabilized with 7% melamine were then added over a period of 4 hours. After reacting for about 16 hours the mass was discharged into 500 parts of water, stirred until completely dissolved, and 148 parts concentrated NH₄OH were added. The partially neutralized solution was then diluted with water to 1390 parts and filtered. The syntan solution thus prepared had a pH of 5.3.

*Example 2*

250 parts naphthalene were heated to 163° C. and 428 parts of concentrated H₂SO₄ slowly added over a period of 15 minutes. The solution was heated at about this temperature for about 5 more minutes. 370 parts of water were added while blowing air through the solution. To the solution, cooled to 103° C., were added 8 parts of activated charcoal and then 136.6 parts of a 50% solution of formaldehyde stabilized with 7% melamine. The mixture was heated by steam coils for about 20 hours at 90° C. and was then dissolved in 500 parts of water. 435 parts of concentrated ammonium hydroxide were then added and air was blown through the mixture to remove excess ammonia. The solution was then cooled to 65° C. and filtered, 88 parts concentrated H₂SO₄ were added to adjust the solution to 0.8 normal and the solution was then diluted with water to 2300 parts.

The amount of melamine employed to stabilize the formaldehyde is preferably on the order of 7% but varies with the strength of the formalin used. However, improvement in the color and color-stability of the tanning solutions and the leather tanned with the aid of such solutions is definitely improved when even as little as 1% melamine is employed as stabilizer. As stated above, the use of more than 10% melamine dissolved in the formaldehyde solution is not recommended since greater amounts lead to the formation of undesirable gels on prolonged storage. It will be understood, of course, that the methods of tanning leather with our improved solutions are not substantially different from those customarily employed when using tanning agents of the same general class.

What we claim is:

1. A method of preparing tanning agents which comprises reacting a member of the group consisting of sulfonated phenols and sulfonated aromatic hydrocarbons with an aqueous solution of formaldehyde having not more than 10% of melamine dissolved therein until a water-soluble product is obtained.

2. A method of preparing tanning agents which comprises reacting a sulfonated phenol with an aqueous solution of formaldehyde having not more than 10% of melamine dissolved therein until a water-soluble product is obtained.

3. A method of preparing tanning agents which comprises reacting a sulfonated alkyl phenol with an aqueous solution of formaldehyde having not more than 10% of melamine dissolved therein until a water-soluble product is obtained.

4. A method of preparing tanning agents which comprises reacting sulfonated o-amyl phenol with an aqueous solution of formaldehyde having not more than 10% of melamine dissolved therein until a water-soluble product is obtained.

5. A method of preparing tanning agents which comprises reacting a sulfonated cresol with an aqueous solution of formaldehyde having not more than 10% of melamine dissolved therein until a water-soluble product is obtained.

6. A method of preparing tanning agents which comprises reacting a sulfonated naphthalene with an aqueous solution of formaldehyde having not more than 10% of melamine dissolved therein until a water-soluble product is obtained.

ROBERT C. SWAIN.
PIERREPONT ADAMS.